United States Patent [19]

Karpol et al.

[11] Patent Number: 5,311,111
[45] Date of Patent: May 10, 1994

[54] METHOD OF CALIBRATING A STEP MOTOR

[75] Inventors: Avner Karpol, Tel-Aviv; Amnon Ganot, Petach Tikva, both of Israel

[73] Assignee: Orbotech Ltd., Nes Ziona, Israel

[21] Appl. No.: 706,767

[22] Filed: May 29, 1991

[51] Int. Cl.$^5$ ............................................. G05B 19/40
[52] U.S. Cl. ..................................... 318/685; 318/696
[58] Field of Search ................. 318/64, 295, 298, 668, 318/685, 696

[56] References Cited

U.S. PATENT DOCUMENTS

| | | | |
|---|---|---|---|
| 4,455,520 | 6/1984 | Ward et al. | 318/696 X |
| 4,584,512 | 4/1986 | Pritchard | 318/696 X |
| 4,710,691 | 12/1987 | Bergstrom et al. | 318/696 X |
| 4,929,879 | 5/1990 | Wright et al. | 318/696 X |

*Primary Examiner*—William M. Shoop, Jr.
*Assistant Examiner*—Karen Masih

[57] ABSTRACT

A method for calibrating a microstep motor comprising a step motor having a plurality of stator coils, a pair of drivers for applying respective driving voltages to the stator coils. Amplitude adjustment means are coupled to each of the drivers for adjusting the amplitudes of the respective driving voltages and offset adjustment means are coupled to each of the drivers for adjusting the d.c. offsets of the respective driving voltages. The method permits compensation for non-linearities associated with the stator coils, and comprises the steps of adjusting at least one of the amplitude adjustment means a predetermined amount, so as to produce a signal having a specified amplitude, measuring an imbalance of the motor, adjusting the offset and amplitude adjustment means as required in order to reduce the measured imbalance, and iteratively repeating the offset and amplitude adjustments as required until no further reduction in the measured imbalance is possible.

23 Claims, 4 Drawing Sheets

METHOD OF CALIBRATING A STEP MOTOR

FIELD OF THE INVENTION

This invention relates to step motors and in particular to a method for calibrating such motors.

BACKGROUND OF THE INVENTION

Step motors are rotary or linear motors using magnetic fields as the driving forces. FIG. 1 shows schematically a rotary step motor 10 comprising a stator 11 having four pairs of stator coils 12a, 12b; 13a, 13b; 14a, 14b and 15a, 15b, each pair of stator coils being aligned on opposite sides of the stator 11.

Rotatably mounted within the stator 11 is a rotor 18 which, for the sake of explanation, can be considered as a permanent magnet having a plurality of poles a, a'; b, b' and c, c'.

In operation, a pulse train is applied successively to each pair of stator coils 12a, 12b; 13a, 13b; 14a, 14b; and 15a, 15b so as, in effect, to generate a rotating magnetic field which induces similar rotation in the rotor 18 so that corresponding poles of the rotor 18 become aligned with the magnetic field produced by the energized stator coils.

Step motors are typically used in electromechanical systems wherein a rotary or mechanical movement is required whose magnitude is exactly proportional to a predetermined digital signal. The resolution of the digital component of such a system can easily be increased by increasing the number of bits of digital data from which the digital signal is composed. However, in order to translate the increased resolution of the digital signal into a corresponding increase in the resolution of the step motor, it is necessary to design the step motor so that each pulse applied to its stator coils results in a discrete but reduced rotation of the rotor. Thus, for example, if the resolution of the digital signal is increased by four, then each pulse applied to the stator coils of the step motor will reduce the angular rotation of the step motor by a factor of four.

In the simple arrangement shown in FIG. 1, each pulse applied to opposite coils of the stator 11 results in the rotor 18 rotating through an angle of 15°. Thus, when the coils 14a and 14b are energized (no voltage being applied to any of the remaining stator coils), the rotor 18 will rotate through an angle of 15° until the two poles b and b' of the rotor 18 nearest to the stator coils 14a and 14b are exactly aligned therewith. If now the stator coils 15a and 15b are energized (no voltage being applied to any of the remaining stator coils), then the rotor 18 will execute a further 15° angular rotation until the poles a and a' become aligned with the opposite stator coils 15a and 15b. Since each pulse which is applied to respective stator coils results in a 15° angular rotation of the rotor 18, the resolution of such a step motor 10 is only 15°.

It is known to increase the resolution of the step motor by energizing adjacent stator coils simultaneously by means of respective sinusoidal signals having identical amplitudes but being out of phase with respect to each other by 90°. By this means, a driving signal applied to two adjacent stator coils results in a reduced rotation of the rotor 18 such that opposite poles thereof settle between the energized coils rather than in alignment with opposite stator coils.

The technique of energizing adjacent stator coils simultaneously in a step motor, is called micro-stepping and permits the effective resolution of the step motor to be increased many times such that high positioning tolerances can be achieved without loss in speed performance.

It has been shown that higher positional resolution of the step motor may be achieved when adjacent stator coils are energized with sampled sine and cosine phase currents (i.e. 90° out of phase). FIG. 2 shows schematically a typical arrangement for driving a step motor by applying sine and cosine inputs 21 and 22, respectively, to adjacent stator coils thereof.

Each of the two input voltages 21 and 22 is fed to respective drivers 23 and 24, their respective d.c. offsets being adjustable by potentiometers 25 and 26 and their amplitudes being adjustable by means of potentiometers 27 and 28, respectively.

Typically, the drivers of the step motor 20 are calibrated by adjusting the d.c. offsets by means of the two potentiometers 25 and 26 (constituting offset adjustment means) until the resulting d.c. offsets of both the sine and cosine inputs are zero. The amplitudes of the two inputs are then adjusted by means of the potentiometers 27 and 28 (constituting amplitude adjustment means) until they are equal, the resulting symmetrical, equal amplitude input signals theoretically resulting in a balanced operation of the step motor 20.

Whilst such a method of calibration would, theoretically, result in perfectly balanced operation for an ideal step motor, in practice it is found that there exists a non-linear relationship between the angle of the sine and cosine inputs and the angular rotation of the step motor 20. This non-linear relationship is due to inaccurate electrical, magnetic and mechanical properties of the step motor 20. Thus, for example, the above-described method of calibration assumes that the adjacent stator coils are in all respects identical comprising identical numbers of turns and having precise relative orientation. This, of course, cannot be achieved in practice and results in a slight imbalance in the operation of the step motor 20 which is noticeable when the step motor 20 is used in applications requiring a very high resolution and smooth operation.

SUMMARY OF THE INVENTION

It is an object of the invention to provide an improved method for calibrating a step motor driver so as to compensate for non-linearities associated with the step motor's stator coils.

According to the invention, there is provided in a microstep motor comprising:
   a step motor having a plurality of stator coils,
   a pair of drivers for applying respective driving voltages to said stator coils, and
   adjustment means coupled to at least one of the drivers for adjusting the respective driving voltage;
   a method for calibrating the adjustment means so as to compensate for non-linearities associated with said stator coils, comprising the steps of:
   (a) measuring an imbalance of the motor,
   (b) adjusting said at least one adjustment means as required in order to reduce the imbalance measured in (a), and
   (c) iteratively repeating steps (a) and (b) as required until no further reduction in the measured imbalance is possible.

Typically, the imbalance is measured using an accelerometer, the resulting calibration being repeated iteratively until the measured acceleration is minimized.

In a preferred embodiment, a pair of electrical signal sources are connected to the drivers for inputting thereto respective sine and cosine phase currents and the relative d.c. offsets and amplitudes of the two signals are iteratively adjusted until the measured imbalance is minimized. In such case, calibrating the driver according to the invention will generally result in the amplitudes of the sine and cosine inputs being very slightly different and to their respective d.c. offsets being slightly greater than zero.

According to a preferred embodiment of the invention, the driver is first calibrated approximately in accordance with the manufacturer's specification and is then fine tuned according to the invention. However, it is also possible to invoke the principles of the invention even without first performing an initial coarse calibration.

BRIEF DESCRIPTION OF THE DRAWINGS

The invention will now be described, by way of non-limiting example only, with regard to an improved method for driving a microstep motor and with reference to the accompanying drawings, in which.

DETAILED DESCRIPTION OF PREFERRED EMBODIMENTS

Figure 1:
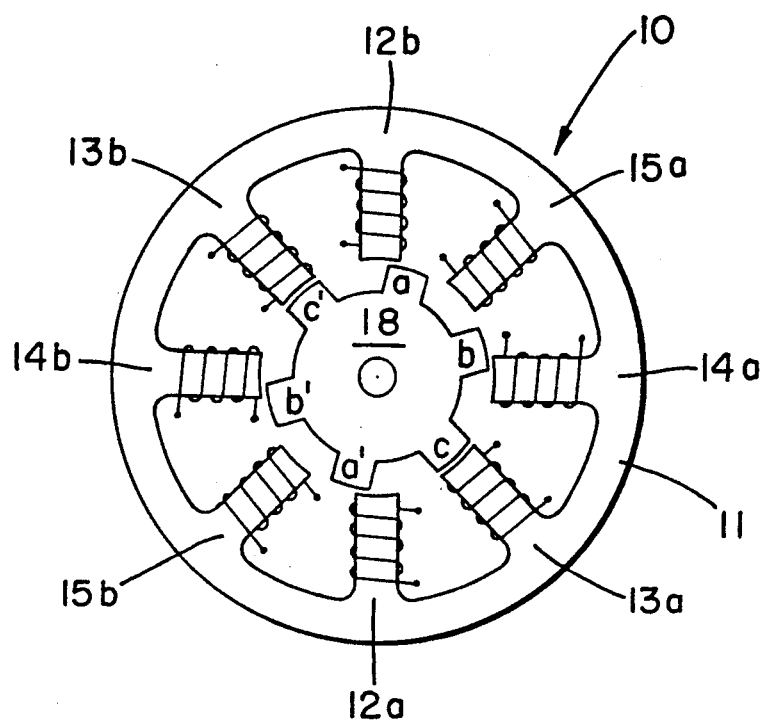
FIG. 1 shows schematically a rotary step motor.
Figure 2:
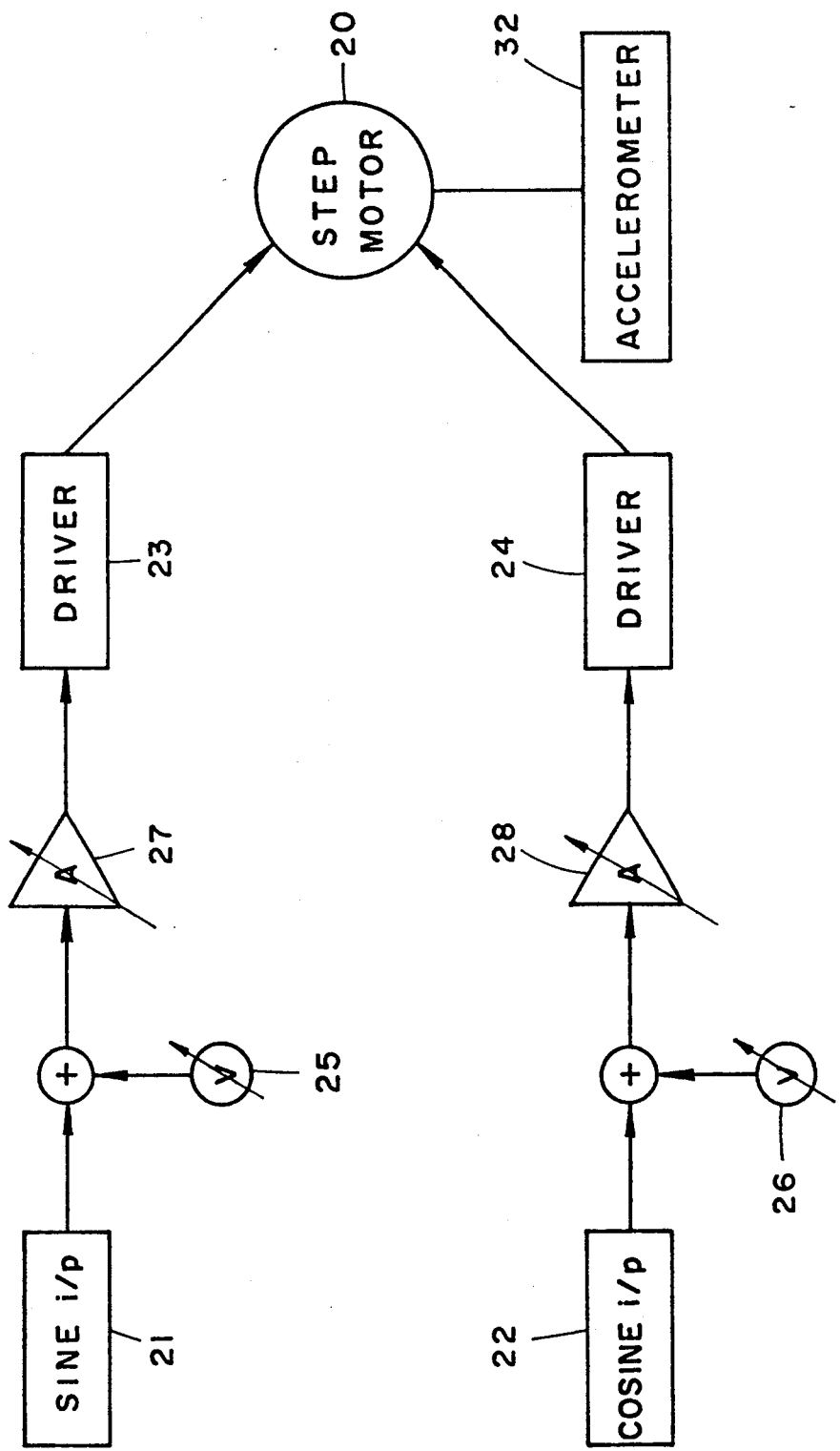
FIG. 2 shows schematically a typical arrangement for driving the step motor shown in FIG. 1.
Figure 2A:
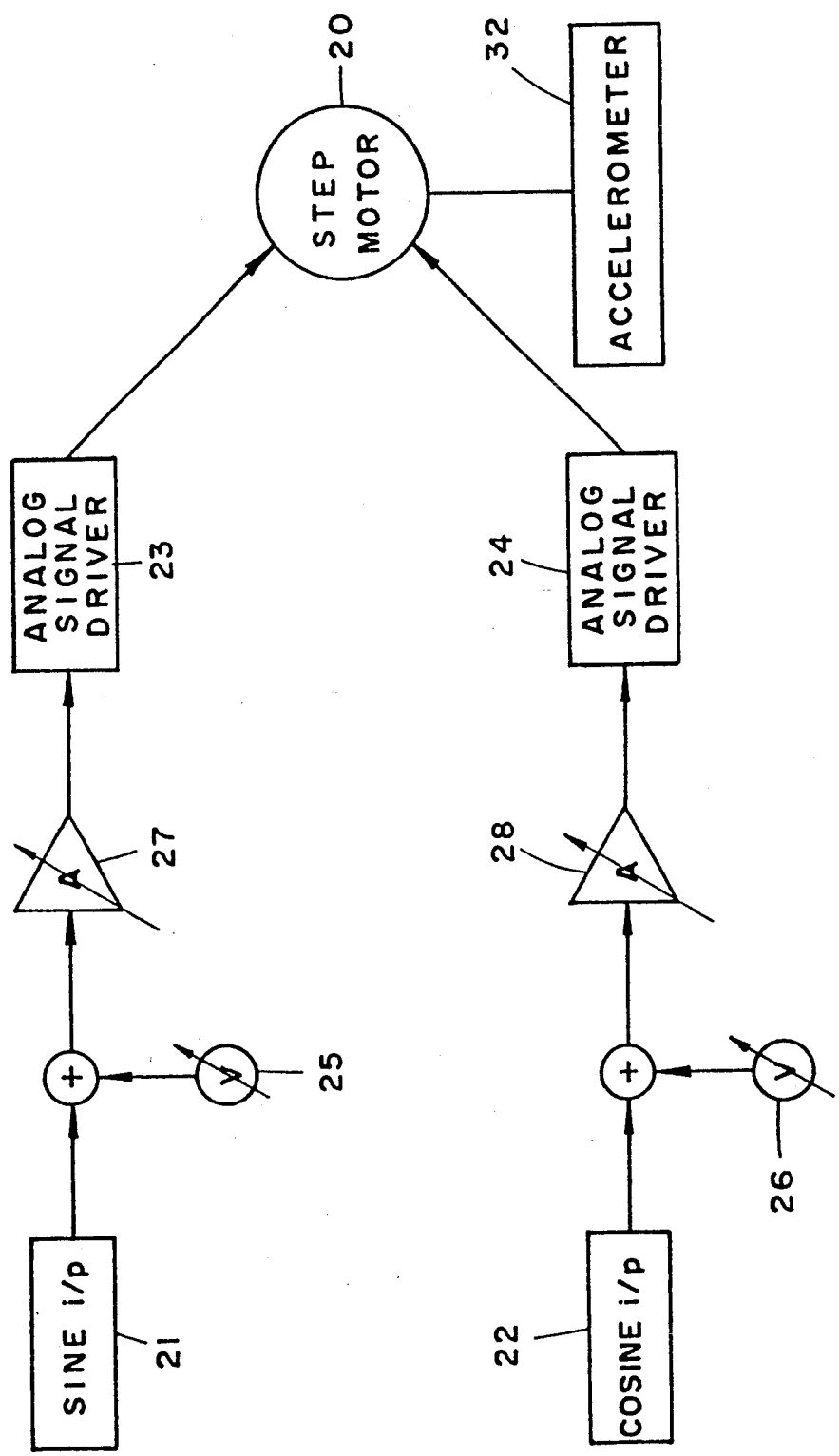
FIG. 2A is a diagrammatically shown arrangement for driving the step motor by analog driving signals.
Figure 3:
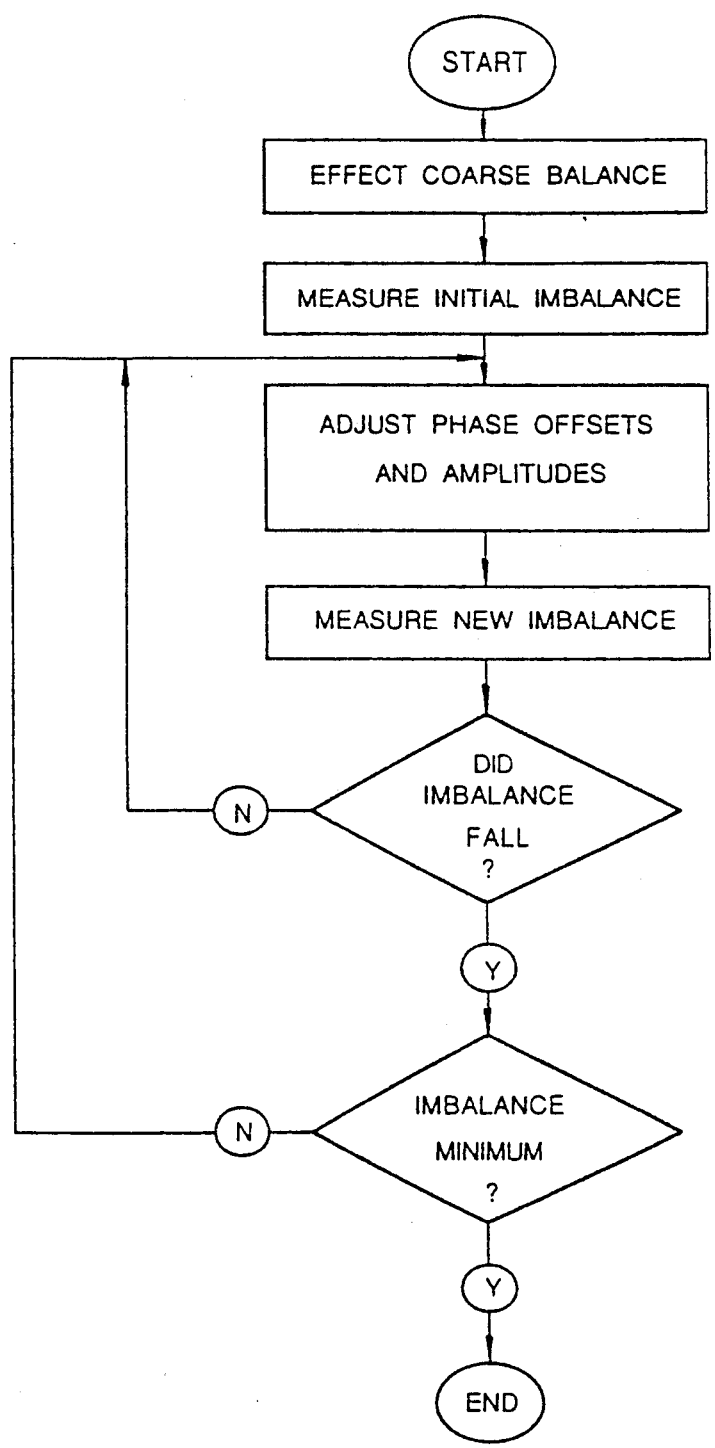
FIG. 3 is a flow-diagram showing the principal steps in a method according to the invention for calibrating the arrangement shown in FIG. 2.

FIG. 3 is a flow-diagram showing the principal steps in accordance with a preferred embodiment of the invention for calibrating the arrangement shown in FIG. 2 and described in detail above.

According to a first preferred embodiment, the drivers 23 and 24 are balanced in the normal way by adjusting the offset potentiometers 25 and 26 until the d.c. offsets of the sine and cosine inputs 21 and 22, respectively, are both zero. Likewise, the amplitude potentiometers 27 and 28 are adjusted until the respective amplitudes of the sine and cosine inputs 21 and 22 are equal.

For the reasons outlined above, such coarse calibration will produce some imbalance in the operation of the step motor 20 which manifests itself as vibration of the step motor 20 and is measured using an accelerometer 32 applied to thereto. Whilst measuring the imbalance in the operation of the step motor 20, the offset potentiometers 25 and 26 are adjusted so as to minimize the measured imbalance, whereafter one of the amplitude potentiometers 27 and 28 is adjusted to minimize the measured imbalance further. The offset and amplitude adjustments are repeated iteratively until the measured imbalance in the operation of the step motor 20 is minimized.

Alternatively, and in accordance with a second preferred embodiment, the amplitude potentiometer 27 of the sine input 21 may be adjusted according to the manufacturer's specification and the amplitude potentiometer 28 may then be adjusted, whilst measuring the imbalance in the operation of the motor, so as to minimize the measured imbalance. This having been done, the offset potentiometers 25 and 26 are then adjusted and the cycle repeated, as required, until the measured imbalance is minimized.

Preferably, the motor 20 is calibrated when operating at its working speed and under its normal working load.

It will be understood that whilst the invention has been described with particular reference to rotary step motors, the invention is equally applicable to linear step motors.

It will further be understood that whilst, according to the preferred embodiments, the imbalance in the operation of the motor is measured using an accelerometer, any other method for measuring the imbalance may equally well be used. For example, the speed of the step motor 20 can be measured, the resulting adjustments being effected so as to produce as uniform and stable a speed as possible.

Furthermore, whilst in the preferred embodiments analogue driving signals are employed and potentiometers are used for effecting the required amplitude and offset adjustments, it will be appreciated that digital driving signals may also be employed. In either case, the offsets and amplitudes of the driving signals may be adjusted either using digital or analogue devices.

Also, the provision of sinusoidal driving signals in the preferred embodiment is again by way of example only and other forms of driving signal may equally well be employed. In such case, non-linearities in the step motor coils may still be compensated for using the method and system according to the invention.

Finally, it should be understood that although separate offset and amplitude adjusting means are provided in the preferred embodiment, this too is not a requirement. Specifically, step motor drivers exist on the market having less than four potentiometers, such that complete, independent control over both the driving signals' d.c. offsets and their amplitudes is not provided. In such cases, adjustments are made to those d.c. offsets and amplitudes for which adjustment is provided, as appropriate, until the measured imbalance is minimized.

We claim:

1. A method for calibrating adjustment means of a microstep motor including a step motor having a plurality of stator coils, said adjustment means, and a pair of drivers for applying respective driving voltages to said stator coils, wherein at least one of said adjustment means is coupled to at least one of the drivers for adjusting the respective driving voltage;

the method comprising the steps of:
 (a) measuring an imbalance of the motor by an accelerometer,
 (b) adjusting said at least one adjustment means as required in order to reduce the imbalance measured in (a), and
 (c) iteratively repeating steps (a) and (b) as required until no further reduction in the measured imbalance is possible to calibrate said adjustment means so as to compensate for non-linearities associated with said stator coils.

2. The method according to claim 1, wherein the driving voltages are of equal amplitude and the adjustment means includes d.c. offset adjustment means for adjusting a d.c. offset of the one of the driving voltages relative to a d.c. offset of the other driving voltage.

3. The method according to claim 1, wherein the driving voltages have equal d.c. offsets and the adjustment means includes amplitude adjustment means for adjusting an amplitude of the one of the driving voltages relative to an amplitude of the other driving voltage.

4. The method according to claim 1, wherein a plurality of adjustment means are provided including separate d.c. offset and amplitude adjustment means for adjusting respective d.c. offsets and amplitudes of two driving voltages.

5. The method according to claim 4, comprising the steps of:
   adjusting at least one of the amplitude adjustment means a predetermined amount, so as to produce a signal having a specified amplitude,
   measuring an imbalance of the motor,
   further adjusting the d.c. offset and amplitude adjustment means as required in order to reduce the imbalance measured in, and
   iteratively repeating said measuring and further adjusting steps as required until no further reduction in the in the measured imbalance is possible.

6. The method according to claim 1, and comprising the steps of providing said step motor with said adjustment means formed as analog devices and applying to said stator coils by said pair of drivers the driving voltages as analog signals.

7. The method according to claim 1, wherein the calibration is effected at a working speed of the motor.

8. The method according to claim 1, comprising the step of providing a linear step-motor as said step motor.

9. A method for calibrating d.c. offset and amplitude adjustment means of a microstep motor including a step motor having a plurality of stator coils, a pair of drivers for applying respective driving voltages to said stator coils, a pair of electrical signal sources coupled to respective ones of said drivers for supplying said driving voltages thereto, a pair of said amplitude adjustment means each coupled to a respective one of the electrical signal sources for adjusting amplitudes of the respective driving voltages, and a pair of said d.c. offset adjustment means each coupled to a respective one of the electrical signal sources for adjusting d.c. offsets of the respective driving voltages;
   the method comprising the steps of:
   (a) adjusting at least one of the amplitude adjustment means a predetermined amount so as to produce a signal having a specified amplitude,
   (b) measuring an imbalance of the motor by an accelerometer,
   (c) adjusting the d.c. offset and amplitude adjustment means as required in order to reduce the imbalance measured in (b), and
   (d) iteratively repeating steps (b) and (c) as required until no further reduction in the measured imbalance is possible so as to compensate for non-linearities associated with said coils.

10. The method according to claim 9, wherein step (a) further includes the steps of:
    (i) adjusting the second amplitude adjustment means until the respective amplitudes are substantially equal, and
    (ii) adjusting the offset adjustment means until the respective d.c. offsets are substantially zero.

11. The method according to claim 9, wherein steps (c) and (d) include the steps of:
    (i) adjusting a second one of the amplitude adjustment means so as to minimize said imbalance,
    (ii) adjusting a first one of the offset adjustment means so as to further minimize said imbalance, and
    (iii) adjusting a second one of the offset adjustment means so as further to minimize said imbalance.

12. The method according to claim 9, wherein the calibration is effected at a working speed of the motor.

13. The method according to claim 9, comprising the step of providing a linear step-motor as said step motor.

14. The method according to claim 9, wherein the driving voltages are sinusoidal.

15. The method according to claim 9, wherein the driving voltages are 90° out of phase with respect to each other.

16. A method for calibrating a microstep motor, comprising the steps of:
    providing a step motor having a plurality of stator coils;
    providing a plurality of drivers for applying respective driving voltages to said stator coils;
    providing a plurality of electrical signal sources each coupled to a respective driver for supplying driving voltages thereto;
    providing a plurality of amplitude adjustment means and connecting each of said amplitude adjustment means between the respective driver and the respective electrical signal source for adjusting amplitudes of the respective driving voltages;
    providing a plurality of d.c. offset adjustment means and connecting each of said d.c. offset adjustment means to a respective electrical signal source for adjusting d.c. offsets of the respective driving voltages; and
    calibrating the d.c. offset and amplitude adjustment means,
    said calibrating step including the following steps:
    measuring initial imbalance of the motor,
    adjusting at least one of the amplitude adjustment means a predetermined amount so as to produce a signal having a specified amplitude and applying said signal to the respective driver for suppling a predetermined driving signal to the step motor,
    measuring a new imbalance of the motor,
    adjusting the d.c. offset and amplitude adjustment means to supply adjusted driving signals to the motor as required in order to reduce the measured imbalance, and
    iteratively repeating the d.c. offset and amplitude adjustments as required until no further reduction in the measured imbalance is possible thereby calibrating the d.c. offset and amplitude adjustment means to compensate for non-linearities associated with said coils.

17. The method according to claim 16, wherein said step of adjusting at least one of the amplitude adjustment means further includes the steps of:
    adjusting a second amplitude adjustment means until the respective amplitudes of the at least one and the second amplitude adjustment means are substantially equal, and
    adjusting the d.c. offset adjustment means until the d.c. offsets of the respective driving voltages are substantially zero.

18. The method according to claim 16, comprising the step of providing a linear step-motor as said step motor.

19. The method according to claim 16, wherein said imbalance in said measuring step is measured by an accelerometer.

20. The method according to claim 16, wherein the driving voltages applied to said stator coils in said step of providing a plurality of drivers for applying respective driving voltages are 90° out of phase with respect to each other.

21. The method according to claim 1, comprising the steps of providing said step motor with said adjustment means formed as digital devices and applying to said stator coils by said pair of drivers the driving voltages as analog signals.

22. The method according to claim 1, comprising the steps of providing said step motor with said adjustment means formed as digital devices and applying to said stator coils by said pair of drivers the driving voltages as digital signals.

23. The method according to claim 1, comprising the steps of providing said step motor with said adjustment means formed as analog devices and applying to said motor coils by said pair of drivers the driving voltages as digital signals.

* * * * *